United States Patent [19]

Luerken et al.

[11] Patent Number: 4,644,606
[45] Date of Patent: Feb. 24, 1987

[54] LAWN/GARDEN BLOWER/VACUUM

[75] Inventors: Adolf Luerken, Rancho Palos Verdes; John S. Cannistra, Chatsworth; John L. Zimmerer, Torrance; Edward J. Pilatowicz, Los Angeles, all of Calif.

[73] Assignee: McCulloch Corporation, Los Angeles, Calif.

[21] Appl. No.: 720,883

[22] Filed: Apr. 8, 1985

[51] Int. Cl.$^4$ ............................................. A47L 5/14
[52] U.S. Cl. ..................................... 15/330; 15/344; 15/405; 15/410
[58] Field of Search .................... 15/405, 327 C, 410, 15/330, 344

[56] References Cited

U.S. PATENT DOCUMENTS

| | | | |
|---|---|---|---|
| 2,292,435 | 8/1942 | Crites | 15/321 |
| 4,288,886 | 9/1981 | Siegler | 15/405 |
| 4,318,203 | 3/1982 | Satoh et al. | 15/344 |
| 4,325,163 | 4/1982 | Mattson et al. | 15/330 |
| 4,451,951 | 6/1984 | Satoh | 15/330 |
| 4,461,055 | 7/1984 | Zerrer et al. | 15/405 X |

*Primary Examiner*—Chris K. Moore
*Attorney, Agent, or Firm*—Murray and Whisenhunt

[57] ABSTRACT

The present invention is directed to an internal combustion engine-powered, blower/vacuum device. The device has an air chamber with an axial air inlet and a tangential air outlet. The engine rotatably drives the impeller, and is controlled by a throttle. A handle is located above the air chamber and the motor, and includes a first section having an axis generally parallel to the axis of the air outlet, and an adjoining section having an axis which extends at an angle of about 15° to 60° to the first section. When the first section of the handle is gripped by an operator the device will be in the vacuum position with the air outlet in a generally horizontal position. When the second section of the handle is gripped, the device will be in the blower position with the air outlet facing ahead of the operator at a downward angle. The impeller and housing of the device is designed to minimize debris hangup within the housing. The impeller blades have a front edge facing the air inlet extending at an angle to the impeller blade radial plane from the vicinity of the impeller hub to the vicinity of the air inlet. The portion of the air inlet closest to the front edge of the impeller is separated therefrom by a distance of from 0.15 inches to 0.27 inches, to reduce debris hangup in the inlet while maintaining good impeller efficiency.

15 Claims, 7 Drawing Figures

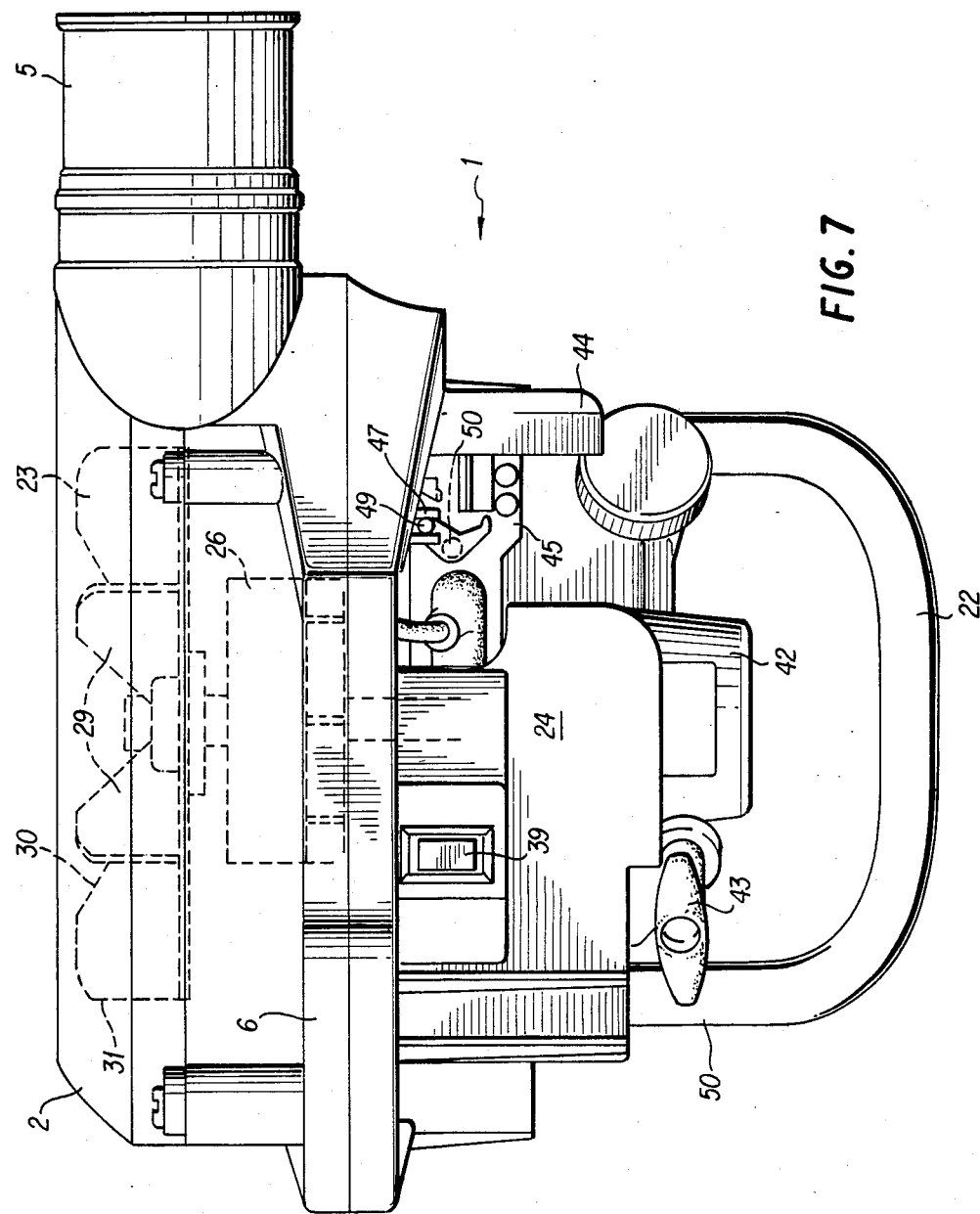

LAWN/GARDEN BLOWER/VACUUM

FIELD OF THE INVENTION

The present invention relates to a hand-held blower/vacuum, especially suited for yard and garden use. The device is useful to blow yard or garden debris, such as leaves or grass cuttings, when in the blower mode, or to collect debris when in the vacuum mode.

BACKGROUND OF THE INVENTION

Hand-held powered blowers, and especially electric powered blowers, are becoming more and more commonplace in the United States for the cleaning up of lawns and gardens. In lieu of sweeping and raking, these electric blowers facilitate the removal of leaves and grass clippings from turf, and dirt and debris from sidewalks, patios, driveways and other outdoor surfaces.

It is known to modify the electric blowers to provide vacuum ability to the devices, wherein an attachment kit is used to permit a vacuum nozzle to be attached to the impeller inlet of the electric blower, and a collection bag, generally supported by the user's shoulder, is attached to the impeller discharge. To date, however, no gasoline-powered blowers with vacuum capability are on the commercial market in the U.S.

Satoh U.S. Pat. No. 4,451,951 is directed to a vacuum/blower device having a dual opening in an outer surface, with an air switching slide pipe slidable on the surface to selectably determine which opening will be utilized. While no mention of a cooling fan appears in the patent specification, FIG. 2 of the patent drawings appears to disclose the use of coaxial fans (that is, separate cooling fan and impeller).

Damon U.S. Pat. No. 3,417,470 is directed to a hedge trimmer having two handles, each with an associated switch. The front handle is U-shaped, with a switch inside of the handle associated with an actuator which projects through the handle to be easily pulled by an operator as he grips the handle to operate the switch. The switch is a dead-mans switch, as is a similar switch on the second handle, so that if either or both handles are released the switches are opened, automatically stopping the electric hedge trimmer cutting blade.

Knouse U.S. Pat. No. 2,263,136 is directed to a portable saw having a handle with duplex grips thereon. Switch actuating means are associated with each of the grips, and so positioned that upon the user grasping either grip the associated switch may be operated to close the motor circuit and operate the electric saw. Other types of handle/trigger construction are illustrated in U.S. Pat. Nos. 400,890, 1,691,291, 2,159,590 and 2,588,000.

Umbricht U.S. Pat. No. 2,890,660 is directed to a nonclogging centrifical pump designed to specifically reduce the possibility of clogging regardless of the degree of contamination of the liquid being pumped. The impeller blades are tapered to decrease their size from their inner edges to their outer edges to provide relatively high exit velocity and pressure. The bottom edges of the blades, adjacent the liquid inlet, are inclined upwardly and outwardly, and spaced with uniform clearance from the upper inclined surface of the casing ring. The casing ring itself has a slope of 25°, which means that the angle of the impeller blade is also 25°, extending from the impeller hub to the outer circumference of the impeller in a direction away from the impeller inlet.

Benediker U.S. Pat. No. 3,894,695 is directed to a disintegrator comprising two concentric motor driven rotors rotating in opposite directions, with each rotor carrying at least one circular series of working tools, and at least one of the circular series of working tools being provided with fan blades which extend within the circular series of the working tools, with each fan blade being disposed between two working tools.

Kamelmacher U.S. Pat. No. 3,964,840 is directed to a centrifugal pump impeller blade, wherein the blade includes a pumping surface having concave portions adjacent the blade tip running in to a convex portion adjacent the suction end of the impeller.

Stahle U.S. Pat. No. 4,347,035 is directed to a single-blade impeller centrifical pump useful to transport sewage and the like. The impeller discharge end lies in a radial plane adjacent a housing wall, with a clearance between the housing wall and the discharge end. The blade face is directed to the housing wall to form an acute angle with that wall, with the line between the outer extremity of the blade and the discharge end of the blade forming an acute angle relative to the axial direction of the impeller. The sharpened front edge of the impeller provides a moving shearing edge, and the housing wall provides a stationery shearing edge, so that medium pumped into the impeller can be cut and disintegrated between these edges. The angles defined facilitate drawing long-fibered solids into the area for shearing and disintegration.

Other patents showing the state of the art with respect to impellers and disintegrators include Grothe U.S. Pat. No. 2,126,383, Aurig U.S. Pat. No. 2,338,373 and Pallmann U.S. Pat. No. 3,549,093.

SUMMARY OF THE INVENTION

The present invention is directed to a powered, especially an internal combustion engine-powered, lawn and/or garden blower/vacuum device. In one embodiment, the device has an air chamber with an axial air inlet and a tangential air outlet. An impeller rotates within the chamber and draws air through the air inlet, and discharges air through the air outlet. The internal combustion engine rotatably drives the impeller, and the engine is controlled by a throttle. A handle is located generally above the air chamber and the motor, and generally above the center of gravity of the device, and includes a first section having an axis generally parallel to the axis of the air outlet, and an adjoining section having an axis which extends at an angle of about 15° to 60° to the first section, and generally below the first section when the first section is horizontal. The throttle is controlled by a trigger which is located at or near the junction of the first section and the second section. When the first section of the handle is gripped by an operator and held in a generally horizontal orientation, a digit of the operator's gripping hand will be on or near the throttle trigger, with the device being located in the vacuum position with the air outlet being in a generally horizontal position. When the second section of the handle is gripped, and held in a generally horizontal orientation, a digit of the operator's gripping hand will be on or near the throttle trigger, and the device will be in the blower position with the air outlet generally facing ahead of the operator and at a downward angle, so as to facilitate operation of the device as a blower. It is preferred that the motor drive the impeller through a drive shaft, with the impeller and a motor cooling fan being coaxially mounted on the drive shaft.

The impeller and the motor cooling fan are separated by the back of the air chamber (that is, the portion of the air chamber generally opposite the air inlet). The air chamber is preferably of a scroll configuration with the portion of the scroll near the air outlet having a generally curved cross section in at least that portion lying radially outward of the impeller so that debris passing through the device when in the vacuum mode is directed by the impeller radially outward against a curved wall to reduce air chamber cracking. The device preferably includes a second handle which is located at a position remote from, and generally parallel to, the first section of the handle generally lying over the center of gravity of the device. The air chamber scroll is preferably elongated toward the internal combustion engine, so as to partly enclose the internal combustion engine, thereby providing a more compact arrangement.

Another embodiment of the present invention is the design of the impeller and associated housing of the blower/vacuum device to prevent or minimize debris hangup within the housing. The impeller blades have a front edge facing the air inlet and extending at an angle to the impeller blade radial plane of about 15° to about 45°, with the impeller blades widening as they extend from the impeller hub toward the outer circumference of the impeller. The angled portion of the impeller blade extends from the vicinity of the impeller hub to at least the vicinity of the impeller air inlet. It is preferred that the angle of the front edge of the impeller blade be about 25° to 35°, and most preferably about 30°. The impeller can have from two to ten or more impeller blades, preferably 4 to 8 impeller blades, and most preferably has six impeller blades. It is greatly preferred that the portion of the air inlet closest to the front edge of the impeller blade is separated therefrom by a distance of from 0.15 inches to 0.27 inches, and most preferably of 0.20 inches, to reduce debris hangup in the air inlet while maintaining good impeller efficiency.

BRIEF DESCRIPTION OF THE DRAWINGS

The invention will be understood more readily with reference to the accompanying drawings, wherein

FIG. 7 is a top view of the device of FIG. 6, taken along line 7—7.

DETAILED DESCRIPTION OF THE INVENTION

Figure 3:
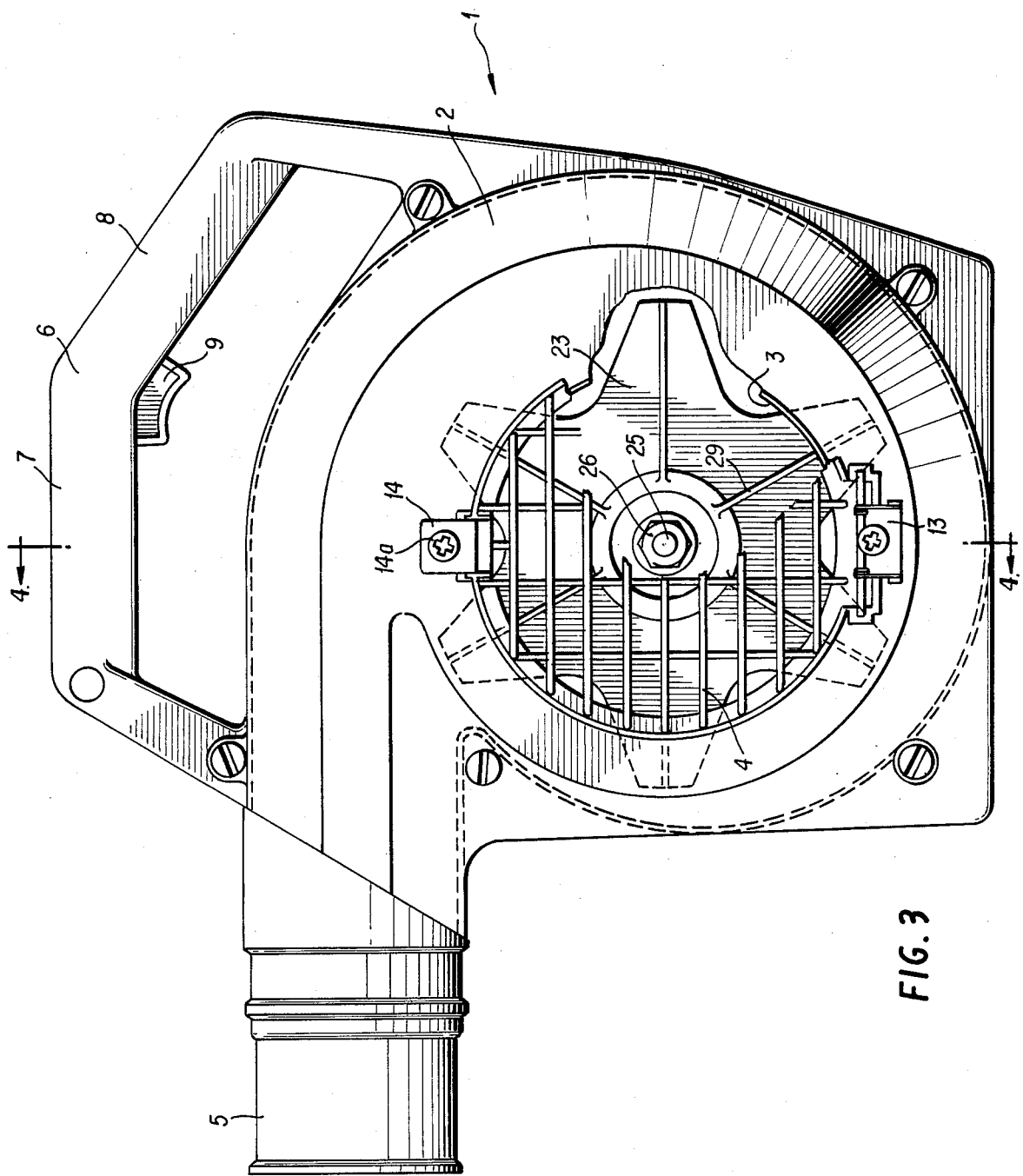
FIG. 3 is a end view partly in section of the device of the present invention, from the air inlet side, without any attachments affixed.

In FIG. 3, blower/vacuum device 1 includes an impeller scroll housing 2 having an air inlet 3 with associated air inlet guard grid 4 protecting against entry of unwanted debris. The housing 2 also includes an air outlet 5, and handle 6. Handle 6 includes a first portion 7, a second portion 8, and a throttle trigger 9 therein between.

Figure 1:
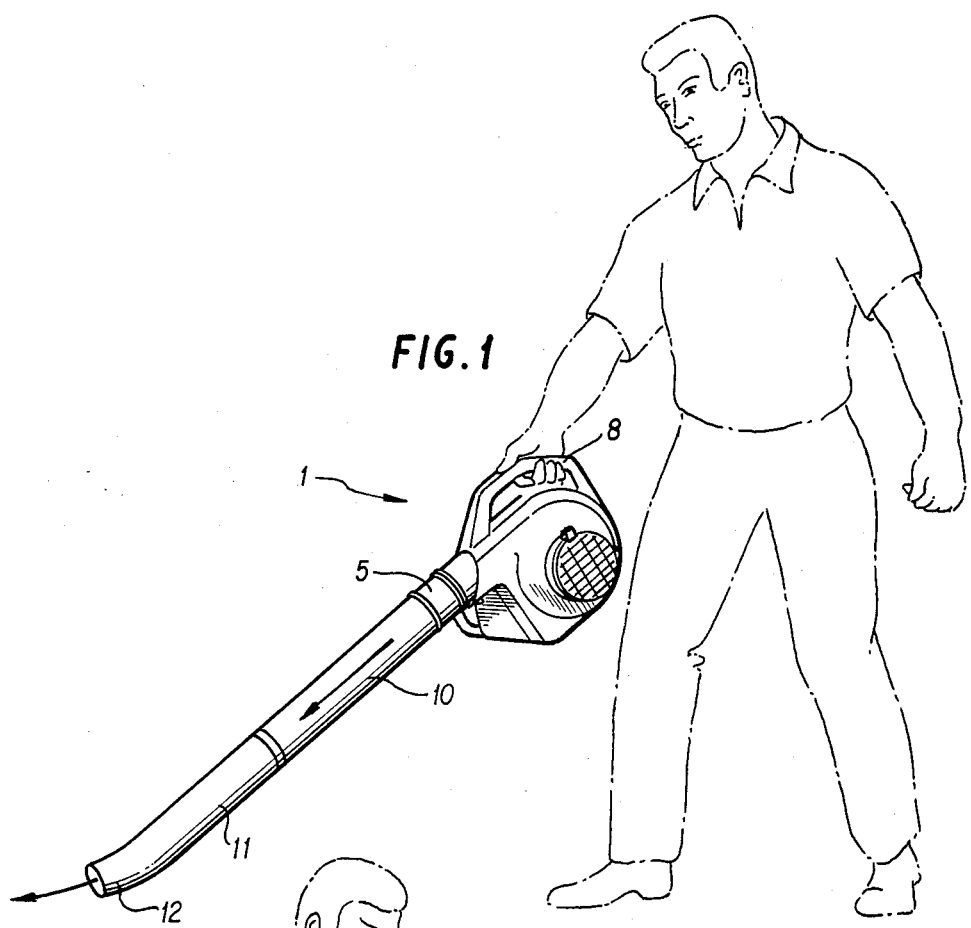
FIG. 1 is a view of a user using the device of the present invention as a blower, with the blower extension tubes and concentrator nozzle attached.

In FIG. 1, the air outlet 5 has extension tubes 10, 11 mounted thereon. Concentrator nozzle 12 is located at the far end of extension tube 11, and changes the air direction by about 30° to allow more precise directing of the air blast when the device is in the blower mode. The concentrator nozzle 12 is of reduced cross-sectional diameter, as compared to extension tubes 10,11, to speed up the air flow velocity. Typically, the concentrator nozzle 12 will be $1\frac{7}{8}$ inches in diameter, compared to extension tube 10 which varys in diameter (to provide a friction fit) from $2\frac{5}{8}$ inches to $2\frac{7}{8}$ inches. The concentrator nozzle 12 may be a separate portion, or may be integrally formed with extension tube 11, as shown. Concentrator nozzle 12, which extends at a 30° angle to extension tube 11, may be conveniently be about 4 inches long, as compared to an $8\frac{1}{2}$ inch length of extension tube 11 and a 15 inch length of extension tube 10. Extension tubes 10,11 can be friction fit or can screw together, as desired, and similar attachments can be made of extension tube 10 to air outlet 5, and of concentrator nozzle 12 to extension tube 11.

It will be noted that when the device is used in the blower mode, the operator grips second portion 8, so that air outlet 5 is pointed forward and downward of device 1. Because of the configuration of concentrator nozzle 12, air discharged from the nozzle will be approximately parallel to the ground and will be at a higher velocity, thereby increasing the efficiency of the blower device.

As will be seen more clearly in FIG. 3, air inlet guard grid 4 includes a guard hinge 13 and a guard lock 14 which securely retains the guard grid when the device 1 is in the blower mode, so as to prevent unwanted debris and clothing or hands of a user from passing through air inlet 3 to the impeller.

Guard lock 14 is preferably a snap-lock device, and for added security a retaining screw 14A may be utilized.

Figure 2:
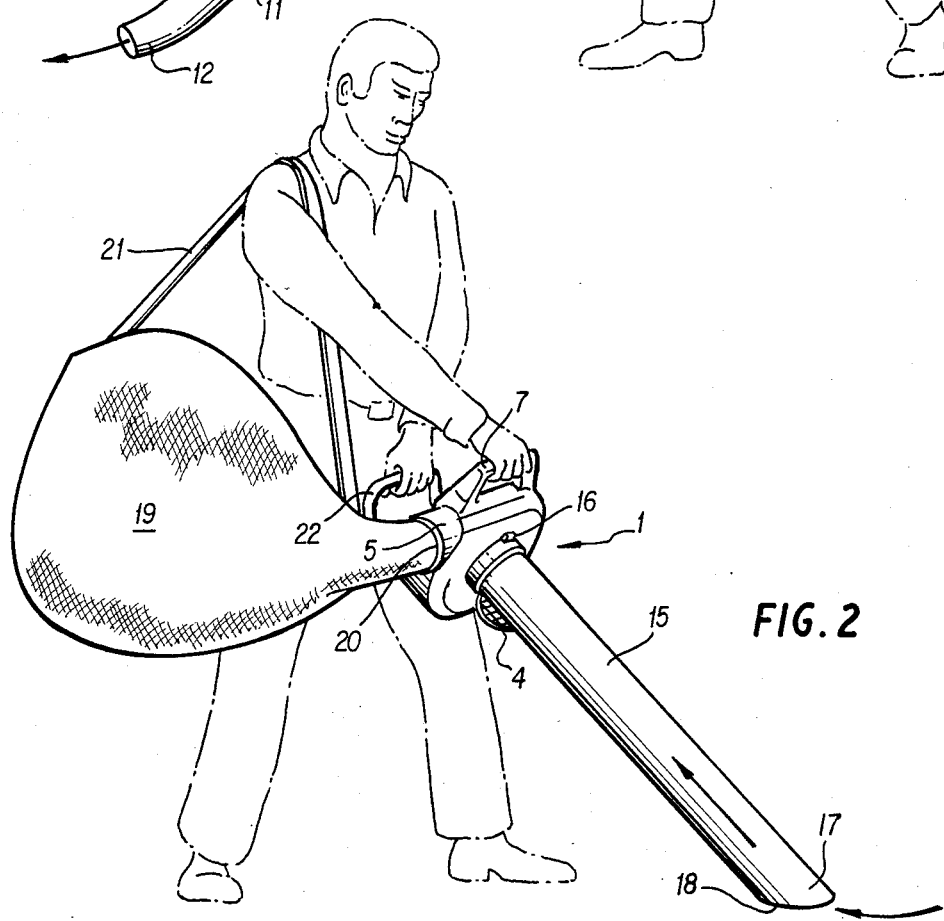
FIG. 2 is a view of an operator using the device of the present invention in the vacuum mode, with vacuum bag and vacuum nozzle attached.

FIG. 2 illustrates device 1 while in the vacuum mode. Guard lock 14 has been undone, and guard grid 4 pivoted around guard hinge 13 to be out of the way of vacuum nozzle 15. Vacuum nozzle 15 conveniently includes a nozzle lock 16 which is similar in design to guard lock 14, and serves to selectively lock nozzle 15 onto air inlet 3. Vacuum nozzle 15, conveniently 37 inches long and $4\frac{1}{2}$ inches in diameter, can be of one piece design, as shown, but is conveniently in two or more sections to allow for more compact storage and shipment. The outer end 17 of vacuum nozzle 15 is conveniently angled so as to define a nozzle air inlet 18 with walls which are approximately the same distance from the ground and thus parallel to the ground when the device 1 is held in the normal vacuum position as shown in FIG. 2.

Vacuum bag 19 is attached to air outlet 5 by any convenient means, such as by fastening strap 20 which can be buckled or can include of Velcro brand fastening strips, and vacuum bag 19 is supported on the user by shoulder strap 21. Vacuum bag 19 conveniently has a zippered opening (not shown) to permit ready discharge from the bag of collected debris.

As will readily be noted from FIG. 2, the operator grips first portion 7 of handle 6 with one hand, and rear handle 22 with the other hand during operation in the blower mode. The two handles are generally parallel to each other, with handle 22 located behind and below first portion 7 of handle 6. Device 1 will be tilted forward, so as to tilt vacuum nozzle 15 toward the ground. The small end of vacuum bag 19 is generally just larger than the outer surface of air outlet 5, so as to slide thereover and be suitably fastened, as mentioned above.

Figure 4:
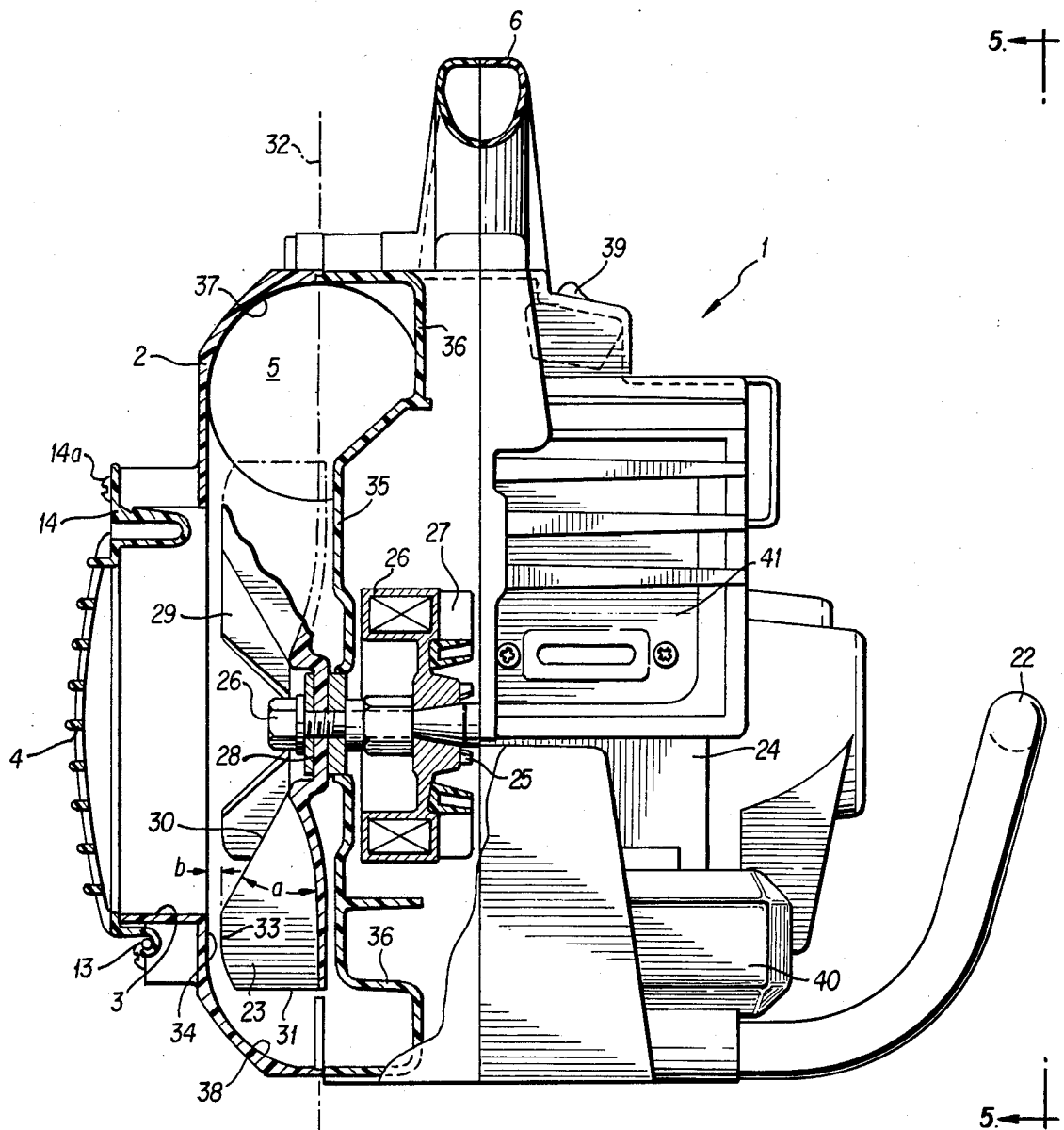
FIG. 4 is a partial cross-sectional back view of the device of FIG. 3, with the section taken along line 4—4.

As will be seen more clearly from FIGS. 3 and 4, impeller 23 is located within impeller scroll housing 2. Motor 24 drives drive shaft 25, which carries impeller 23 thereon. Retaining nut 26 retains impeller 23 on drive shaft 25. Motor 24 is a conventional internal combustion engine, conveniently of 20 to 30 cc displacement. Flywheel 26 is also mounted on drive shaft 25, and rotates thereon together with impeller 23. Cooling fan vanes 27 are mounted on flywheel 26, and provide a stream of cooling air for the internal combustion motor 24, without requiring air to be bled off from the interior of in the impeller housing 2 for cooling purposes.

Impeller 23 includes a central hub 28 and impeller blades 29, preferably from 2 to 10 or so in number, and more preferably 6 in number, with each impeller blade having an angled front edge 30 and an outer edge 31. The back edges of the impeller blades define at their outer ends a radial plane 32, with angled front edge 30 extending at a critical angle a to radial plane 32. Angle a is from 15° to 45°, preferably from about 25° to 35°, and most preferably about 30°. The clearance b between the front edge 33 of the impeller blades and the rear most edge 34 of the air inlet is from about 0.15 inches to about 0.27 inches, preferably 0.20 inches. The combination of the angle of impeller front edge 30 and control of the clearance b between the impeller front edge 33 and the air inlet edge 34 permits the reduction or elimination of the catching of debris in the air chamber 2 or in the air inlet 3, while maintaining good impeller efficiency. If the clearance b is too narrow, insufficient debris will pass through the impeller, and debris will hangup in the impeller. On the other hand, if the clearance is too great then the impeller will be relatively inefficient in operation. Thus, it is most important to have the clearance between 0.15 and 0.20 inches, with the dimension measured parallel to the axis of rotation of the impeller.

The design of air scroll housing 2 of the present invention has several highly advantageous features. Preferably, the back wall 35 of scroll housing 2 effectively seals to prevent the passage of air from housing 2 to the stream of cooling air generated by cooling fan vanes 27, and vice versa. The back outer section 36 of the scroll housing are elongated toward and partly enclose internal combustion motor 24 to permit a more compact arrangement of the parts of device 1. Debris passing through the impeller is flung radially outward from the impeller vanes, so as to strike areas 37, 38 of impeller housing 2. Thus the debris impinges upon the housing 2 in areas wherein the housing 2 is at an angle to the impinging debris, so that the debris will not strike an absolutely flat surface. This tends to reduce cracking of the housing, which is conventionally molded from structural plastics.

Device 1 includes an on-off switch 39, of conventional toggle design, gas tank 40 and muffler 41. As will be more clearly seen in FIG. 5, gas tank 40 includes fill tube 42 and associated cap 42a. The motor includes a recoil starter 42 with associated handle 43, and air cleaner 44 associated with carburetor 45. Throttle trigger 9 is biased by spring 46 to the low speed position. Throttle connecting linkage 47 is pivoted at pivot pin 48, and connected at the end opposite throttle trigger 9 to throttle pin 49. Depression of trigger 9 acts through throttle connecting linkage 47, upon throttle pin 49 and associated plate 49a, to cause throttle shaft 50 to rotate in a counter-clockwise direction as viewed in FIG. 7, thereby opening the throttle in carburetor 45. As illustrated in FIGS. 4, 5, 6 and 7, second handle 22 is generally parallel to first portion 7 of handle 6, and is located behind and below first section 7. The relatively wide spacing of first section 7 and second handle 22 provides a very sturdy handle arrangement. The prior commercial available electric blowers and blower/vacuum devices have utilized second handles which are perpendicular to first handles, rather than parallel thereto, and it was generally considered by the art that such a perpendicular arrangement of handles was necessary. It has unexpectedly been found that the parallel handle arrangement of the present invention provides as good or better operator control over the device while in the vacuum mode, which is when the two handles will be normally be utilized. An added advantage of the arrangement of the present invention is that second handle 22 is formed by tubular member 50, and serves to partly enclose and protect gas tank 40 and other components.

Figure 5:
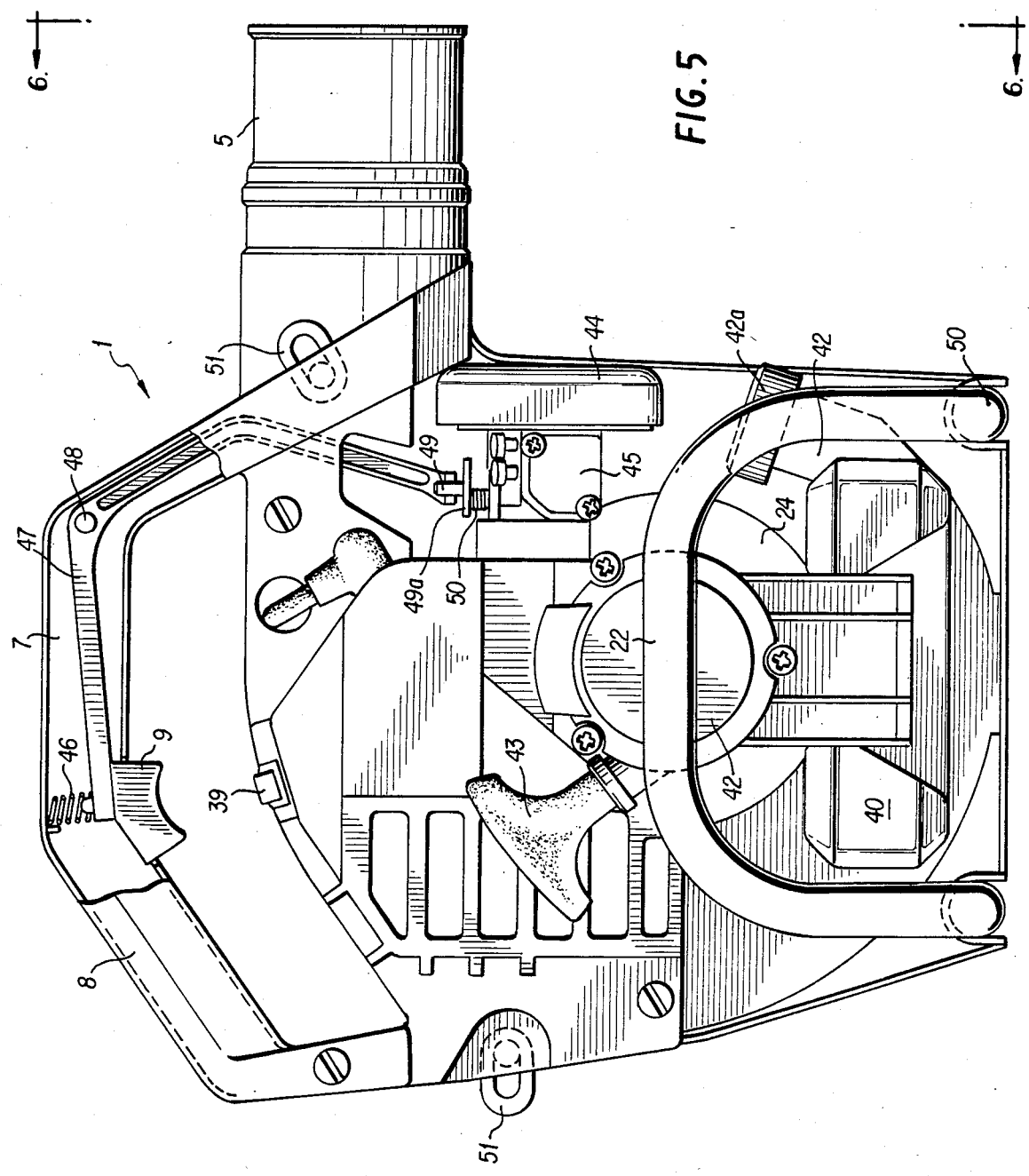
FIG. 5 is a end view of the motor side of the device of FIG. 4, taken along line 5—5.
Figure 6:
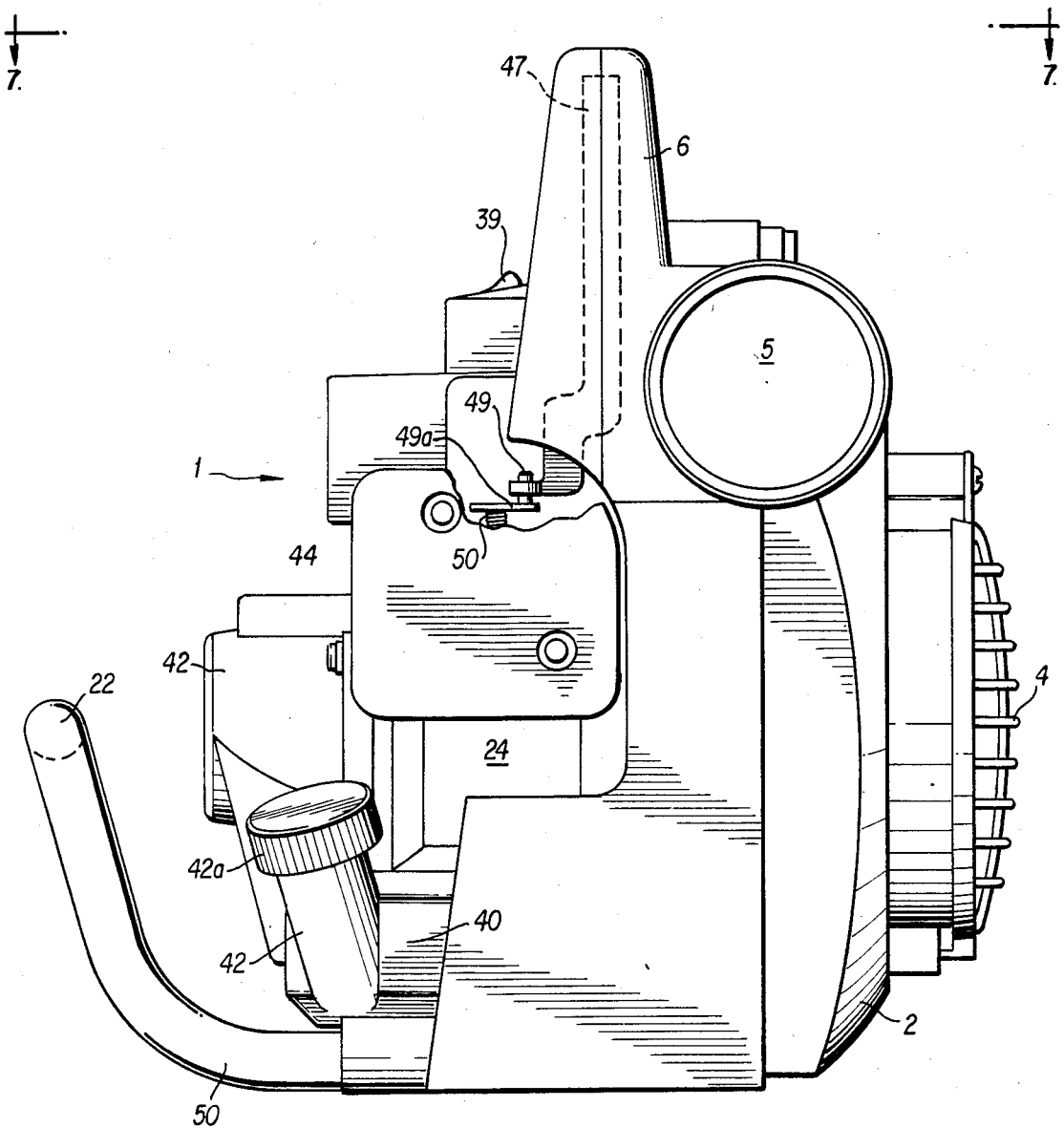
FIG. 6 is a front view of the device of FIG. 5, taken along line 6—6.

As will be seen in FIG. 5, harness links 51 may be provided for attachment of a harness (not shown) to support the device 1 from the user's shoulder if desired.

While handle 6 has been shown as consisting of two essentially straight sections 7, 8, it will be readily appreciated that a curved handle with a mid-handle throttle trigger location, while definitely not as effective as the angle handle design illustrated in the drawings, would be able to enjoy some of the same advantages as the angled handle. The critical handle design, however, is to have the handle arranged so that when a first section is gripped by a user and held in a generally horizontal position, a digit, preferably the index finger, of the operator's gripping hand will be on or near the throttle trigger, to readily control same, and the device will be in the vacuum position with the air outlet generally horizontal, which is the desired position for the connection of the air outlet to the vacuum bag. At the same time, when the second section of the handle is gripped and held in a generally horizontal position, a digit, and preferably the index finger, of the operator's gripping hand will be on or near the throttle trigger, so as to readily operate same, and the device will be in the blower position with the air outlet generally facing ahead of the operator at a downward angle of about 15° to about 60°, and preferably about 30° from the horizontal position, so that the device can be operated as a blower with the user's hand and arm in a comfortable position.

We claim:

1. A hand-held blower/vacuum device comprising an air chamber having a front, a back, an axial air inlet in the front and a tangential air outlet having a central axis thereof, impeller means having an axis and rotatable in the chamber about the axis for drawing air through the air inlet into the chamber and discharging air from the chamber out of the air outlet, motor means for rotatably driving the impeller means, throttle means for controlling the speed of said motor means, handle means generally located above said air chamber and said motor means and generally above the center of gravity of the device and comprising a first section having an axis generally parallel to the axis of the air outlet and an adjoining second section having an axis extending at an angle of about 15° to 60° to the first section and generally below the first section when said first section is horizontal, throttle trigger means located proximate the juncture of said first section and said second section, said handle means for gripping by an operator in either of two preselected modes wherein when the first section is gripped and held in a generally horizontal orientation, with a digit of the operator's gripping hand proximate the throttle trigger means, said device is in the vacuum position with the air outlet generally horizontal, and when the second section is gripped and held in a generally horizontal orientation, with a digit of the operator's gripping hand proximate the throttle trigger means, said device is in the blower position with the air outlet generally facing ahead of the operator and at a downward angle.

2. Device of claim 1, wherein said motor means drives a drive shaft extending into said air chamber, said impeller means being coaxially mounted on said drive shaft, a motor cooling fan being mounted on said drive shaft between said impeller means and said motor means, the back of the air chamber being generally between said impeller means and the motor cooling fan.

3. Device of claim 1, wherein said air chamber is of a scroll configuration with the portion of the scroll near the outlet having a generally curved cross-section at least in the portion radially outward of said impeller means whereby debris passing through the device from the vacuum inlet is directed by the impeller radially outward against a curved wall, so that said debris does not initially impinge upon a flat wall at right angles thereto, to thereby reduce cracking of said air chamber.

4. Device of claim 1, wherein said device includes a second handle located remote from and generally parallel to said first section and said air outlet axis.

5. Device of claim 1, wherein said air chamber scroll is elongated toward and partly encloses said motor means to form a more compact arrangement of parts.

6. A hand-held blower/vacuum device comprising an air chamber having a front, a back, an axial air inlet in the front and a tangential air outlet having a central axis thereof, impeller means having an axis and rotatable in the chamber about the axis for drawing air through the air inlet into the chamber and discharging air from the chamber out of the air outlet, motor means for rotatably driving the impeller means, said air inlet being of smaller diameter than said impeller means and generally coaxial therewith, said impeller means including a central hub smaller than said air inlet and a plurality of impeller blades each having a back edge extending from the hub substantially in a radial plane, and a front edge extending in axial cross-section from the vicinity of the hub to at least the vicinity of the air inlet at an angle to said radial plane of about 15° to about 45°, throttle means for controlling the speed of said motor means, handle means generally located above said air chamber and said motor means and generally above the center of gravity of the device and comprising a first section having an axis generally parallel to the axis of the air outlet and an adjoining second section having an axis extending at an angle of about 15° to 60° to the first section and generally below the first section when said first section is horizontal, throttle trigger means located proximate the juncture of said first section and said second section, said handle means for gripping by an operator in either of two preselected modes wherein when the first section is gripped and held in a generally horizontal orientation, with a digit of the operator's gripping hand proximate the throttle trigger means, said device is in the vacuum position with the air outlet generally horizontal, and when the second section is gripped and held in a generally horizontal orientation, with a digit of the operator's gripping hand proximate the throttle trigger means, said device is in the blower position with the air outlet generally facing ahead of the operator and at a downward angle.

7. Device of claim 6, wherein said motor means drives a drive shaft extending into said air chamber, said impeller means being coaxially mounted on said drive shaft, a motor cooling fan being mounted on said drive shaft between said impeller means and said motor means, the back of the airchamber being generally between said impeller means and the motor cooling fan.

8. Device of claim 6, wherein said air chamber is of a scroll configuration with the portion of the scroll near the outlet having a generally curved cross-section at least in the portion radially outward of said impeller means whereby debris passing through the device from the vacuum inlet is directed by the impeller radially outward against a curved wall, so that said debris does not initially impinge upon a flat wall at right angles thereto, to thereby reduce cracking of said air chamber.

9. Device of claim 6, wherein said device includes a second handle located remote from and generally parallel to said first section and said air outlet axis.

10. Device of claim 6, wherein said air chamber scroll is elongated toward and partly encloses said motor means to form a more compact arrangement of parts.

11. Device of claim 6, wherein said angle is about 25° to about 35°.

12. Device of claim 11, wherein said angle is about 30°.

13. Device of claim 6, wherein from 2 to about 10 impeller blades extend from said hub.

14. Device of claim 13, wherein 6 impeller blades extend from said hub.

15. Device of claim 13, wherein the portion of the air inlet closest to said impeller means is separated therefrom by a distance of from 0.15 inches to 0.27 inches to reduce debris hang-up in the air chamber or the air inlet, while maintaining good impeller efficiency.

* * * * *